(12) United States Patent
Mere

(10) Patent No.: US 10,295,349 B2
(45) Date of Patent: May 21, 2019

(54) FLIGHT MANAGEMENT SYSTEM FOR AN AIRCRAFT AND METHOD OF SECURING OPEN WORLD DATA USING SUCH A SYSTEM

(71) Applicant: AIRBUS OPERATIONS (S.A.S.), Toulouse (FR)

(72) Inventor: Jean-Claude Mere, Verfeil (FR)

(73) Assignee: Airbus Operations (S.A.S.), Toulouse (FR)

( * ) Notice: Subject to any disclaimer, the term of this patent is extended or adjusted under 35 U.S.C. 154(b) by 7 days.

(21) Appl. No.: 15/603,000

(22) Filed: May 23, 2017

(65) Prior Publication Data

US 2017/0343357 A1 Nov. 30, 2017

(30) Foreign Application Priority Data

May 24, 2016 (FR) ..................................... 16 54626

(51) Int. Cl.
*B64D 45/00* (2006.01)
*G01C 23/00* (2006.01)
(Continued)

(52) U.S. Cl.
CPC ............ *G01C 21/20* (2013.01); *B64D 45/00* (2013.01); *G01C 23/00* (2013.01); *G05D 1/0077* (2013.01);
(Continued)

(58) Field of Classification Search
CPC ........ G01C 21/00; G01C 21/20; G01C 23/00; G06F 11/00; G06F 11/2038; B64D 45/00
See application file for complete search history.

(56) References Cited

U.S. PATENT DOCUMENTS

| 4,774,670 A * | 9/1988 | Palmieri ................. G05D 1/101 |
| | | 244/182 |
| 4,811,230 A * | 3/1989 | Graham ............... G05D 1/0061 |
| | | 701/15 |

(Continued)

FOREIGN PATENT DOCUMENTS

| FR | 2748145 A1 | 10/1997 |
| FR | 2908219 A1 | 5/2008 |

OTHER PUBLICATIONS

French Search Report for Application No. 1654626 dated Jan. 20, 2017.

*Primary Examiner* — Yonel Beaulieu

(74) *Attorney, Agent, or Firm* — Jenkins, Wilson, Taylor & Hunt, P.A.

(57) ABSTRACT

A flight management system for an aircraft and method of securing open world data using such a system. The flight management system includes at least two flight management computers including one computer termed active forming part of an active guidance subsystem configured to supply data for guiding the aircraft. Another computer is termed inactive at the current time. The flight management system includes a validation subsystem that includes the inactive flight management computer and a validation unit connected to the flight management computers. The validation subsystem is independent of the active guidance subsystem and configured to validate open world data and to transmit at least to the active flight management computer data that is validated during the validation.

17 Claims, 1 Drawing Sheet

(51) Int. Cl.
  *G05D 1/00* (2006.01)
  *G01C 21/20* (2006.01)
  *G06F 11/20* (2006.01)
  *G08G 5/00* (2006.01)

(52) U.S. Cl.
  CPC .. *G06F 11/2038* (2013.01); *B64D 2045/0075* (2013.01); *G08G 5/0008* (2013.01); *G08G 5/0013* (2013.01); *G08G 5/0021* (2013.01)

(56) References Cited

U.S. PATENT DOCUMENTS

| | | | | |
|---|---|---|---|---|
| 5,475,594 | A * | 12/1995 | Oder | G05D 1/0055 340/971 |
| 6,178,379 | B1 * | 1/2001 | Dwyer | G01S 19/15 244/175 |
| 6,236,913 | B1 | 5/2001 | Bomans et al. | |
| 6,643,580 | B1 * | 11/2003 | Naimer | G01C 21/005 244/1 R |
| 6,955,816 | B2 * | 10/2005 | Klysz | A61K 8/447 424/401 |
| 7,949,438 | B2 * | 5/2011 | Artini | G05D 1/0646 701/3 |
| 8,027,783 | B2 | 9/2011 | Closse et al. | |
| 9,851,219 | B2 * | 12/2017 | Wilson | G01C 23/00 |
| 2005/0182530 | A1 * | 8/2005 | Murphy | G01C 23/00 701/16 |
| 2005/0187677 | A1 * | 8/2005 | Walker | B64C 13/20 701/16 |
| 2015/0150095 | A1 | 5/2015 | Mere et al. | |
| 2018/0183691 | A1 * | 6/2018 | Laluque | G01C 23/00 |

\* cited by examiner

FLIGHT MANAGEMENT SYSTEM FOR AN AIRCRAFT AND METHOD OF SECURING OPEN WORLD DATA USING SUCH A SYSTEM

CROSS-REFERENCE TO RELATED APPLICATION

This patent application claims priority to French patent application FR 16 54626, filed on May 24, 2016, the entire disclosure of which is incorporated by reference herein.

TECHNICAL FIELD

The present disclosure concerns a flight management system for an aircraft, in particular for a transport aircraft, and a method of using such a flight management system to render secure data received from the open world.

This flight management system comprises at least two flight management computers (FMC).

BACKGROUND

Present day avionic architectures generally include a flight management system of this kind in the avionic part that notably offers the crew the possibility of defining pre-flight and maintaining or evolving in-flight the route to be followed to convey the passengers to their destination.

In parallel with these tools, mainly for reasons of cost and simplicity of development, there are numerous initiatives to implement on the open world side functionalities aimed at simplifying the task of the crew relative to the management of the mission of the aircraft.

In the context of the present disclosure:
  the avionic part (or world) refers to secure onboard elements (computer, systems, . . . ) that comply with given integrity and availability constraints; and
  the open world part refers to onboard hardware (laptop computer, tablet, . . . ) in the cockpit of the aircraft hosting applications and containing data that is not sufficiently secure to be integrated into the aircraft as it stands.

In particular, airlines make available to the crew tools for assisting management of the mission that are integrated into an electronic flight bag (EFB) type device or some other laptop computer or touch-sensitive tablet.

These tools enable the crew to prepare the mission in advance or to modify it when they deem it necessary. For the airline there are many advantages of installing these tools on an EFB device: lower cost, homogeneity at the level of the often mixed fleet, greater flexibility of modification or installation, or other advantages.

In the usual architectures, the transmission of open world information to an avionic system is rendered physically impossible to prevent sending of corrupted data or installing malware that can jeopardize the safety of the aircraft.

Now, the data manipulated in the tools of an EFB device is of a kind intended to be loaded into the flight management computer to update the flight plan or the performance computations and providing a secure physical link between the open world data and applications and the avionic flight management computer would make it possible to reduce the workload of the crew, with a reduced probability of error, as they would no longer need to enter this data manually into the flight management computer on the basis of computation results from the EFB device tools.

SUMMARY

An object of the present disclosure is to render secure the insertion of open world data into a flight management system enabling effective operational validation of that data by the crew without having to modify greatly the internal architecture of the flight management computer.

The present disclosure concerns an aircraft flight management system including at least two flight management computers, of which one is termed active at a current time and forms part of an active guidance subsystem configured to supply data for guiding the aircraft at the current time and the other is termed inactive at the current time.

According to the disclosure herein the flight management system includes a validation subsystem comprising the inactive flight management computer and a validation unit connected to the flight management computers, the validation subsystem being independent of the active guidance subsystem and configured to validate open world data and to transmit at least to the active flight management computer data that is validated during the validation.

Accordingly, thanks to the validation employed, the validation subsystem makes it possible to filter erroneous or malicious open world data. This architecture of the flight management system therefore makes possible secure loading of open world data, notably data from an EFB device. To this end, this architecture relies on the usual flight management computers and does not necessitate any major and costly modification of the internal software architecture of the flight management computers to ensure the absence of corruption of parameters, such as the active flight path, for example, by the open world data to be inserted.

This flight management system architecture therefore makes it possible to solve the problem of integration of open world data into the flight management system.

In a preferred embodiment, the validation unit comprises:
  a storage unit configured to store open world data to be validated;
  a computation unit configured to compute a value of at least one parameter from the data; and
  a display unit configured to display at least the computed value of the parameter on at least one display screen, the display unit comprising at least one validation device enabling an operator to declare valid open world data used to compute the displayed value of the parameter.

The present disclosure can be applied to various embodiments of the usual flight management system architectures (comprising at least two flight management computers).

In particular, in a first architecture, in which the flight management system comprises the active flight management computer dedicated to a first pilot flying the aircraft at the current time and the inactive flight management computer dedicated to a second pilot not flying the aircraft at the current time, the validation subsystem advantageously comprises the flight management computer dedicated to the second pilot not flying the aircraft at the current time.

Moreover, in a second architecture in which the flight management system comprises at least one operational principal flight management computer and one backup flight management computer the validation subsystem advantageously comprises the backup flight management computer.

In a preferred embodiment the flight management system includes a filter unit configured to effect protocol filtering of open world data received in the flight management system before its validation by the validation subsystem.

Moreover, and advantageously:
the validation unit is hosted in a dedicated system; or
the validation unit comprises a plurality of subsystems divided between and hosted in a plurality of different avionic systems.

The present disclosure also concerns a method of securing open world data using a flight management system as described above, i.e. one including at least two flight management computers including one, which is a first, flight management computer termed active at a current time that forms part of an active guidance subsystem configured to supply data for guiding the aircraft at the current time, and another, which is a second, flight management computer termed inactive at the current time, and a validation subsystem comprising the inactive flight management computer and a validation unit connected to the flight management computers, the validation subsystem being independent of the active guidance subsystem and configured to validate open world data and to transmit at least to the active flight management computer data validated during the validation.

According to the disclosure herein the data securing method comprises a sequence of validation steps executed after reception by the flight management system of open world data to be validated and comprising:
  a desynchronization step comprising or consisting of using a validation unit to desynchronize the two flight management computers;
  a data processing step comprising or consisting of loading the data to be validated into a flight plan termed secondary of the inactive flight management computer and in the inactive flight management computer using the data to calculate the value of at least one corresponding parameter;
  a display step executed by a display unit and comprising or consisting of displaying the results of the computation on at least one display screen of the display unit for validation;
  a validation step executed by a validation device and comprising or consisting of validating the data or not validating the data;
  a subsequent step comprising or consisting of, in case of or in the event of validation of the data, transferring the validated data to the active flight management computer, deleting the secondary flight plan from the inactive flight management computer after transferring the data and resynchronizing the two flight management computers so that the inactive flight management computer is initialized to at least one flight plan of the active flight management computer.

Moreover, in case of or in the event of non-validation of the data, the subsequent step advantageously comprises or consists of at least sending an error message and deleting the non-validated data from the inactive flight management computer.

Also, the sequence of validation steps advantageously comprises, between the synchronization step and the data processing step, an auxiliary processing step comprising or consisting of, if necessary, deleting from the inactive flight management computer flight plans that it contains.

Moreover, the data processing step advantageously comprises or consists of computing a flight path and predictions.

Also, in a preferred embodiment, the data securing method comprises a step of protocol filtering of the open world data executed by a filter unit before the execution of the sequence of validation steps.

The present disclosure also concerns an aircraft, in particular a transport aircraft, equipped with a flight management system such as that specified above.

BRIEF DESCRIPTION OF THE DRAWINGS

The appended and example figures illustrate how the subject matter herein can be reduced to practice.

DETAILED DESCRIPTION

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

Figure 1:
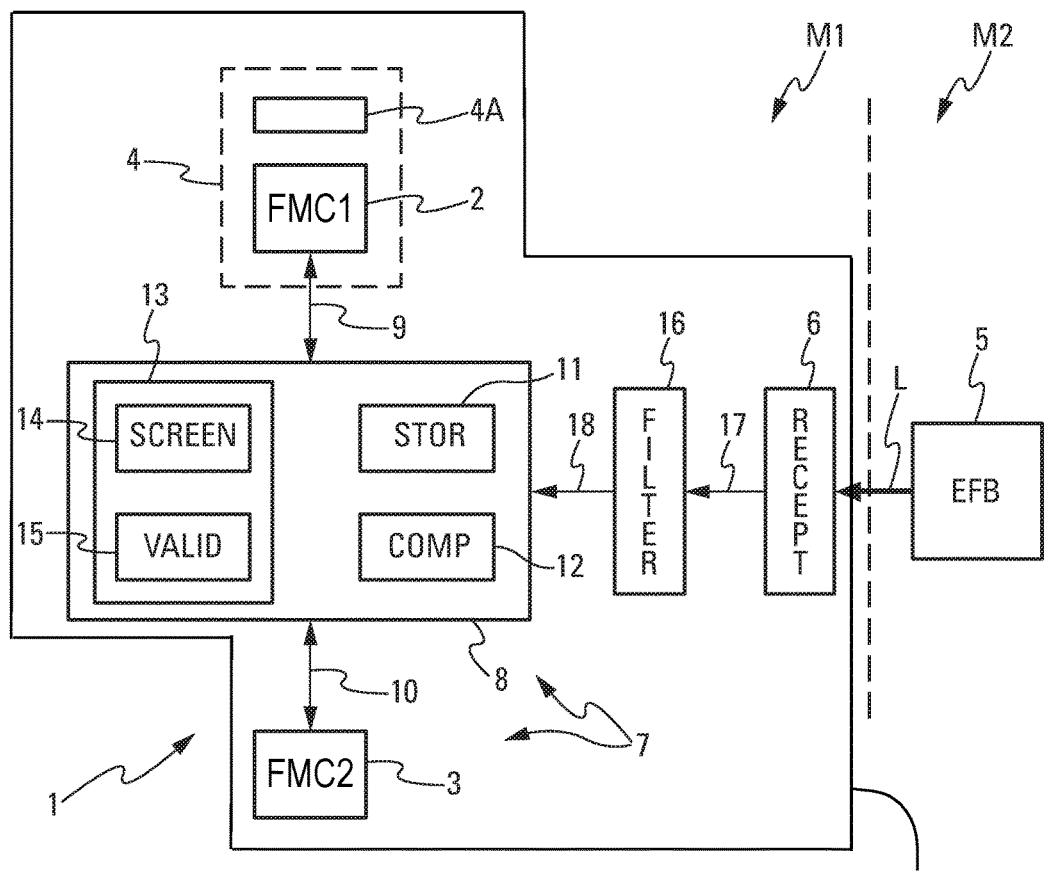
FIG. 1 is a block diagram of one embodiment of an aircraft flight management system.

FIG. 1 shows diagrammatically a flight management system generally designated 1 of an aircraft A, in particular a transport aircraft, that enables illustration of the disclosure herein.

This flight management system 1 ("system 1" hereinafter), which is onboard the aircraft (not shown), comprises at least two flight management computers, which include a first flight management computer 2 ("FMC1") and a second flight management computer 3 ("FMC2"). The two flight management computers 2 and 3 are independent and are hosted in different hardware. The system 1 can comprise more than two flight management computers.

Each of the flight management computers 2 and 3 is configured to perform computations and notably to compute navigation waypoints for the aircraft. The aircraft is guided in accordance with data (and notably guidance set points) supplied by a guidance subsystem 4, termed the active guidance subsystem, which comprises only one of the flight management computers. This guidance subsystem 4 of the usual type further comprises a set 4A of data processing and computation systems and is not described further in the following description.

In the following description, it is considered that at a current time (i.e. at the time of the use of the disclosure herein as described below), the first, active flight management computer 2 forms part of the active guidance subsystem 4, which is configured to supply the data for the guidance of the aircraft at the current time, and the second flight management computer 3 is inactive at the current time.

The system 1, which forms part of the avionics generally designated M1 of the aircraft, is configured to be able to render secure data received from an open world part generally designated M2 and notably navigation data to be loaded into the flight management system (for example route, weather, or other information).

In a particular embodiment, the open world part M2 comprises an electronic flight device 5, for example of EFB ("Electronic Flight Bag") type, or some other laptop computer or touch-sensitive tablet, in particular enabling preparation of a flight of the aircraft.

The transmission of information from the open world part M2 to the system 1 may notably be via an Internet link, an A429 type bus or a Wifi link, as illustrated in FIG. 1 by an arrow L indicating a data link.

As shown in FIG. 1, the system 1 includes a reception unit ("RECEPT") 6 configured to receive open world data transmitted via the data link L.

According to the disclosure herein, the system 1 includes a validation subsystem generally designated 7. Validation subsystem 7 comprises the second, inactive flight management computer 3 and a validation unit 8 connected to the flight management computers 2 and 3 by respective connections 9 and 10.

The validation subsystem 7 is independent of the active guidance subsystem 4 and is configured to validate data coming from the open world part M2, as described below and enabling filtering of erroneous or malicious data, and to be able to transmit at least to the first, active flight management computer 2 data that has been validated by that validation.

In a preferred embodiment validation unit 8 comprises, as shown for example in FIG. 1:
- a storage unit (STOR) 11 configured to store open world data to be validated received via the data link L;
- a computation unit (COMP) 12 configured to compute a value of at least one parameter from that data, which is stored in the storage unit 11; and
- a display unit 13 configured to display at least the computed value of the parameter on at least one display screen (SCREEN) 14. The display unit 13 also comprises at least one validation unit (VALID) 15 that enables an operator to declare valid open world data used to compute that displayed value of the parameter. The validation unit 15 can be a physical unit, such as a pushbutton, for example. It can also and preferably be a human/machine interface that is displayed on the display screen 14 and that can be activated by a crew member.

Moreover, in a preferred embodiment, the system 1 also includes a filter unit (FILTER) 16 that is connected to the reception unit 6 and to the validation unit 8 by respective connections 17 and 18. This filter unit 16 is configured to perform protocol filtering of data open world received in the flight management system 1 before its validation by the validation subsystem 7.

Accordingly, in this preferred embodiment, securing the sending of data from the open world part M2 to the flight management system 1 comprises two levels of protection (or filtering):
- a first level of protection implemented by the filter unit 16, which is linked to the exchange protocol and to the format of the data; this filtering enables flooding problems to be circumvented and frames to be rejected if they do not have the expected format or out of domain data to be rejected; and
- a second level of protection implemented by the validation unit 8, which is of a more operational nature and enables filtering of erroneous or malicious data relative to the function that this data is going to feed at the level of the aircraft but which has been sent in the correct format and therefore has not been rejected by the first level of protection.

Moreover, the validation unit 8 may be implemented in various ways.

In a first variant the validation unit 8 is hosted in a dedicated system.

Moreover, in a second variant the validation unit 8 comprises a plurality of subsystems divided between and hosted in a plurality of different avionic computers or systems.

Moreover, the present disclosure can be applied to different embodiments of the usual flight management system architectures comprising at least two flight management computers.

In a first architecture of the usual split cockpit type, as represented in FIG. 1 for example, the flight management system 1 comprises at least one first flight management computer 2 dedicated to a first pilot flying the aircraft at the current time (or Pilot Flying (PF)) and a second flight management computer 3 dedicated to a second pilot not flying the aircraft at the current time (or Pilot Non Flying (PNF)).

In this first architecture, the second flight management computer 3 of the PNF forms part of the validation subsystem 7.

Moreover, in a second embodiment of the usual architecture (not shown), the flight management system comprises at least one operational principal flight management computer and one backup flight management computer.

In this second architecture the backup flight management computer forms part of the validation subsystem.

The flight management system 1 as described above therefore comprises:
- an architecture of the usual kind and typically identical to that of existing aircraft that includes at least two flight management computers 2 and 3; and
- a new feature or function to enable functional validation (or operational validation) on the result of the use of the data received by the client system for that data at the same time as ensuring complete segregation between the validation subsystem 7 and the active guidance subsystem 4 being used to guide the aircraft.

The flight management system 1 therefore makes it possible to ensure the security of the data received from the open world part M2. The flight management system 1 has an avionic architecture enabling secure loading of open world data, that architecture relying on existing flight management computers 2 and 3 without necessitating major and costly modification of the internal software architecture of those flight management computers 2 and 3 to ensure the absence of corruption by the open world data to be inserted of parameters such as the active flight path being used.

The validation performed by the validation subsystem 7 on inserting open world data into the system 1 is not effected throughout the operation and flight of the aircraft. In fact, the insertion of open world data represents a relatively short time and a relatively low frequency of occurrence over the duration of a flight. The inactive flight management computer 3 (used for the validation) therefore remains available for the implementation of the usual functions for most of the flight time.

This functional validation of data, notably navigation data to be loaded into a flight management computer (for example route, weather, or other information) is effective because it relies in particular on verification by the crew of the consistency of the path and the predictions resulting from the use of that data by the flight management system 1.

There is described hereinafter the operation of the flight management system 1 to render secure open world data received using a method of securing data that notably comprises a sequence of validation steps executed after reception by the flight management system 1 (via the reception unit 6) of open world data to be validated. The sequence SE of steps is represented in FIG. 2.

Figure 2:
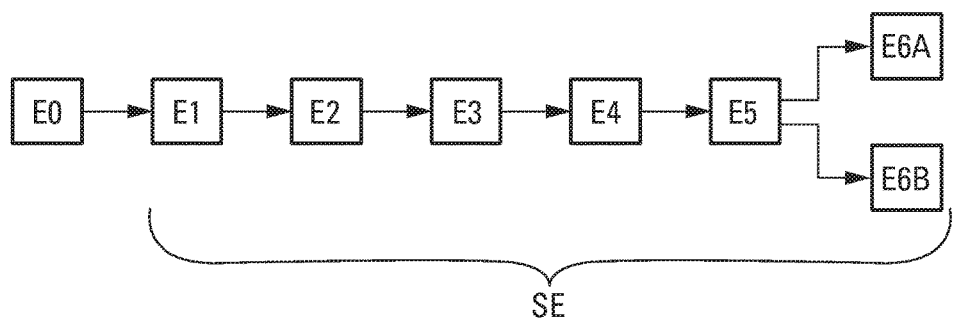
FIG. 2 shows diagrammatically a method of securing data using the flight management system from FIG. 1.

In a preferred embodiment, the method of securing data also comprises, as shown in FIG. 2, a filtering step E0 comprising or consisting of effecting protocol filtering of the open world data. Filtering step E0 is implemented by the filter unit 16 prior to the use of the sequence SE of validation steps.

In the normal operating mode, in the context of a split cockpit type architecture, the second, inactive flight management computer 3 is synchronized to the first, active flight management computer 2 in the usual way and recovers the active flight plan and the corresponding data regularly, so as to be able to replace the active flight management computer 2 in case of or in the event of a fault or to address particular requirements of this architecture by presenting a second image to the PNF pilot.

On reception of data from the open world part M2, notably from an EFB device, and after fruitful protocol filtering implemented by the filter unit 16, the active flight management computer 2 is informed by the validation unit 8 of the availability of data coming from the open world part M2 by displaying a message, for example of "CPNY FPLN DATA" type.

If the crew decides to receive the data, the validation unit 8 will manage the execution of the sequence generally designated SE of steps.

Sequence SE of steps comprises, as shown in FIG. 2 (in relation to the elements from FIG. 1):

a desynchronization step E1 comprising or consisting of using the validation unit 8 to desynchronize the two flight management computers 2 and 3 and switch the inactive flight management computer 3 to an independent mode;

an auxiliary processing step E2 comprising or consisting of, if necessary, deleting from the inactive flight management computer 3 the flight plans that it contains;

a data processing step E3 comprising or consisting of loading the data to be validated into a so-called secondary flight plan of the inactive flight management computer 3 and using the computation unit 12 or some other computation element to calculate the value of at least one parameter from that data; the data processing step E3 preferably comprises or consists of computing a flight path and predictions;

a display step E4 implemented by the display unit 13 comprising or consisting of displaying the results of the computation on the display screen 14 of the display unit 13 to inform the crew with a view to validation thereof and displaying a validate/reject human/machine interface (validation device 15) so that the crew can accept or refuse the data;

a validation step E5 implemented by the crew using the validation device 15, i.e. the human/machine interface, and comprising or consisting of the crew validating or not validating the data;

a subsequent step E6A comprising or consisting of, in case of or in the event of validation of the data by the crew:

transferring the validated data to the active flight management computer 2 (in a secondary flight plan or alternatively directly into the active flight plan of that flight management computer 2);

deleting the secondary flight plan from the inactive flight management computer 3 after transferring the data; and resynchronizing the two flight management computers 2 and 3 so that the inactive flight management computer 3 is initialized to at least one flight plan of the active flight management computer 2 and therefore resumes its dual FMC role to serve both as a second source of information and a backup system.

Also, in case of or in the event of non-validation of the data by the crew, the method comprises a subsequent step E6B comprising or consisting of:

sending an error message; and deleting the non-validated data from the inactive flight management computer 3.

In a split cockpit type architecture the flight management computer dedicated to the PNF pilot (who is not flying the aircraft) is used for the validation of the open world data by presenting that data only on the PNF side, the active data continuing to be presented on the other (PF) side to monitor the guidance of the aircraft, or temporarily masking the active data if necessary for effecting this validation on both sides.

In a first embodiment, the computation unit 12 is integrated into the flight management computer 3, and in a second embodiment the computation unit 12 is not integrated into the flight management computer 3.

The flight management system 1 as described above has numerous advantages. In particular it enables for example:

optimization of the avionic architecture by balancing the roles of the various embodiments of the flight management system;

avoiding major and costly modifications of the flight management computers; and not basing the demonstration of security on the architecture of the system that is the responsibility of the equipment supplier.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft flight management system comprising:
at least two flight management computers, of which a first computer termed active at a current time forms part of an active guidance subsystem configured to supply data for guiding an aircraft at the current time, and a second computer is termed inactive at the current time;

a validation subsystem comprising the second, inactive flight management computer and a validation unit connected to the first and second flight management computers;

the validation unit comprising a display unit and at least one display screen, wherein the validation unit is configured to display at least a computed value of a parameter on the at least one display screen;

the display unit comprising a validation device enabling an operator to declare valid open world data used to compute the displayed value of the parameter;

wherein the validation subsystem is independent of the active guidance subsystem and configured to allow validation of open world data and to transmit at least to the first, active flight management computer data that is validated during the validation.

2. The aircraft flight management system according to claim 1, wherein the validation unit comprises:
a storage unit configured to store open world data to be validated; and
a computation unit configured to compute a value of at least one parameter from the data.

3. The aircraft flight management system according to claim 2, wherein the flight management system comprises the first, active flight management computer dedicated to a first operator flying the aircraft at the current time and the second, inactive flight management computer dedicated to a second operator not flying the aircraft at the current time, and wherein the validation subsystem comprises the second, inactive flight management computer dedicated to the second operator not flying the aircraft at the current time.

4. The aircraft flight management system according to claim 2, wherein the aircraft flight management system comprises at least one operational principal flight management computer and one backup flight management computer, and wherein the validation subsystem comprises the backup flight management computer.

5. The aircraft flight management system according to claim 1, wherein the aircraft flight management system comprises at least one operational principal flight management computer and one backup flight management computer, and wherein the validation subsystem comprises the backup flight management computer.

6. The aircraft flight management system according to claim 1, wherein the flight management system comprises the first, active flight management computer dedicated to a first operator flying the aircraft at the current time and the second, inactive flight management computer dedicated to a second operator not flying the aircraft at the current time, and wherein the validation subsystem comprises the second, inactive flight management computer dedicated to the second operator not flying the aircraft at the current time.

7. The aircraft flight management system according to claim 1, wherein the validation unit is hosted in a dedicated system.

8. The aircraft flight management system according to claim 1, wherein the validation unit comprises a plurality of subsystems divided between and hosted in a plurality of different avionic systems.

9. A method of securing open world data using an aircraft flight management system, the aircraft flight management system comprising:
at least two flight management computers, of which a first computer termed active at a current time forms part of an active guidance subsystem configured to supply data for guiding an aircraft at the current time, and a second computer is termed inactive at the current time;
a validation subsystem comprising the second, inactive flight management computer and a validation unit connected to the first and second flight management computers;

the validation unit comprising a display unit and at least one display screen, wherein the validation unit is configured to display at least a computed value of a parameter on the at least one display screen;

the display unit comprising a validation device enabling an operator to declare valid open world data used to compute the displayed value of the parameter; and wherein the validation subsystem is independent of the active guidance subsystem and configured to allow a validation of open world data and to transmit at least to the first, active flight management computer data that is validated during the validation;

the method comprising a sequence of validation steps executed after reception by the flight management system of open world data to be validated by an operator and comprising:
a desynchronization step comprising using a validation unit to desynchronize the two flight management computers;
a data processing step comprising loading the data to be validated into a flight plan termed secondary of the inactive flight management computer and the inactive flight management computer calculating the value of at least one corresponding parameter using the data;
a display step executed by a display unit and comprising displaying results of the computation on at least one display screen of the display unit for validation;
a validation step executed by an operator acting on the validation device and comprising validating the data or not validating the data by the operator;
a subsequent step comprising, in case of validation of the data, transferring the validated data to the active flight management computer, deleting the secondary flight plan from the inactive flight management computer after transferring the data and resynchronizing the first and second flight management computers so that the inactive flight management computer is initialized to at least one flight plan of the active flight management computer.

10. The method according to claim 9, wherein in case of non-validation of the data, the subsequent step at least comprises sending an error message and deleting the non-validated data from the second, inactive flight management computer.

11. The method according to claim 10, wherein the sequence of validation steps comprises, between the synchronization step and the data processing step, an auxiliary processing step comprising, if necessary, deleting from the second, inactive flight management computer flight plans that the second, inactive flight management computer contains.

12. The method according to claim 9, wherein the sequence of validation steps comprises, between the synchronization step and the data processing step, an auxiliary processing step comprising, if necessary, deleting from the second, inactive flight management computer flight plans that the second, inactive flight management computer contains.

13. The method according to claim 9, wherein the data processing step comprises computing a flight path and predictions.

14. The method according to claim 9, comprising protocol filtering of the open world data executed by a filter unit before execution of the sequence of validation steps.

15. An aircraft comprising an aircraft flight management system, the aircraft flight management system comprising:
at least two flight management computers, of which a first computer termed active at a current time forms part of an active guidance subsystem configured to supply data for guiding the aircraft at the current time, and a second computer is termed inactive at the current time;
a validation subsystem comprising the second, inactive flight management computer and a validation unit connected to the first and second flight management computers;
the validation unit comprising a display unit and at least one display screen, wherein the validation unit is configured to display at least a computed value of a parameter on at least one display screen;
the display unit comprising a validation device enabling an operator to declare valid open world data used to compute the displayed value of the parameter; and
wherein the validation subsystem is independent of the active guidance subsystem and configured to allow a validation of open world data and to transmit at least to the first, active flight management computer data that is validated during the validation.

16. An aircraft flight management system comprising:
at least two flight management computers, of which a first computer termed active at a current time forms part of an active guidance subsystem configured to supply data for guiding an aircraft at the current time, and a second computer is termed inactive at the current time; and
a validation subsystem comprising the second, inactive flight management computer and a validation unit connected to the first and second flight management computers;
the validation unit comprising:
at least one display screen, wherein the validation unit is configured to display at least a computed value of a parameter on the at least one display screen; and
a validation device enabling an operator to declare valid open world data used to compute the displayed value of the parameter;
wherein the validation subsystem is configured to allow validation of open world data and to transmit at least to the first, active flight management computer data that is validated during the validation.

17. A method of securing open world data using an aircraft flight management system, the aircraft flight management system comprising:
at least two flight management computers, of which a first computer termed active at a current time forms part of an active guidance subsystem configured to supply data for guiding an aircraft at the current time, and a second computer is termed inactive at the current time; and
a validation subsystem comprising the second, inactive flight management computer and a validation unit connected to the first and second flight management computers;
the validation unit comprising:
at least one display screen, wherein the validation unit is configured to display at least a computed value of a parameter on the at least one display screen; and
a validation device enabling an operator to declare valid open world data used to compute the displayed value of the parameter;
wherein the validation subsystem is configured to allow a validation of open world data and to transmit at least to the first, active flight management computer data that is validated during the validation;
the method comprising, after reception by the flight management system of open world data:
executing a desynchronization step comprising using the validation unit to desynchronize the two flight management computers;
executing a data processing step comprising loading the data to be validated into a flight plan termed secondary of the inactive flight management computer and the inactive flight management computer calculating the value of at least one corresponding parameter using the data;
executing a display step, by the validation unit, comprising displaying results of the computation on at least one display screen of the validation unit for validation;
executing a validation step, on the validation device, comprising validating the data or not validating the data by the validation device; and
executing a subsequent step comprising, in case of validation of the data, transferring the validated data to the active flight management computer, deleting the secondary flight plan from the inactive flight management computer after transferring the data and resynchronizing the first and second flight management computers so that the inactive flight management computer is initialized to at least one flight plan of the active flight management computer.

* * * * *